United States Patent
Takahashi et al.

(10) Patent No.: US 6,479,099 B1
(45) Date of Patent: Nov. 12, 2002

(54) METHOD FOR MANUFACTURING FILTER HAVING CERAMIC POROUS FILM AS SEPARATING FILM

(75) Inventors: Tomonori Takahashi, Chita; Manabu Isomura, Tsushima; Masahiro Murasato, Chita, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/647,125
(22) PCT Filed: Jan. 31, 2000
(86) PCT No.: PCT/JP00/00523
§ 371 (c)(1), (2), (4) Date: Sep. 26, 2000
(87) PCT Pub. No.: WO00/45945
PCT Pub. Date: Aug. 10, 2000

(30) Foreign Application Priority Data

Feb. 1, 1999 (JP) .......................... 11-024461
Mar. 29, 1999 (JP) .......................... 11-086603

(51) Int. Cl.⁷ .............................. B05D 7/00; B05D 7/26
(52) U.S. Cl. ................... 427/244; 427/245; 427/247; 427/299; 427/419.2
(58) Field of Search ......................... 427/243, 244, 427/245, 247, 299, 419.2

(56) References Cited

U.S. PATENT DOCUMENTS 4,719,058 A  1/1988  Komoda
5,656,220 A * 8/1997  Whittemore et al. ....... 264/623
6,077,800 A * 6/2000  Takahashi et al. ........... 501/80

FOREIGN PATENT DOCUMENTS

| JP | 63-66566  | 12/1988 |
| JP | 2-90927   | 3/1990  |
| JP | 2-126924  | 5/1990  |
| JP | 3-284329  | 12/1991 |
| JP | 8-245278  | 9/1996  |

OTHER PUBLICATIONS

English translation of JP 2–90927 A, Mar. 30, 1990.*

* cited by examiner

Primary Examiner—Michael Barr
Assistant Examiner—Kirsten A. Crockford
(74) Attorney, Agent, or Firm—Burr & Brown

(57) ABSTRACT

A method for manufacturing a filter utilizing a ceramic porous membrane is provided, comprising the step of depositing a film deposition slurry containing ceramic framework particles on the surface of a porous substrate. The slurry contains an organic polymer for expanding gaps among the ceramic framework particles, and the micro-pore size of the porous membrane is controlled by adjusting the weight ratio between the framework particles and the organic polymer in the slurry, thereby enabling a porous membrane having a desired micro-pore size to be formed irrespective of the particle size of the framework particles.

5 Claims, 3 Drawing Sheets

METHOD FOR MANUFACTURING FILTER HAVING CERAMIC POROUS FILM AS SEPARATING FILM

FIELD OF THE INVENTION

The present invention relates to a method for manufacturing a filter utilizing a porous ceramic membrane (referred to as a porous membrane hereinafter) as a separation film. In more detail, the present invention relates to a method for manufacturing a filter wherein the micro-pore size of the porous membrane can be controlled irrespective of the particle size of framework particles.

BACKGROUND OF THE INVENTION

Filters utilizing ceramic porous membrane separation films are more useful for solid-liquid separation filters as compared with filters utilizing a polymer membrane as a separation film. In addition to the advantages that the micro-pore size of the porous ceramic membrane that determines filtration ability is precisely controllable, the ceramic filter is highly reliable due to its excellent physical strength, durability, and high corrosion resistance to acids or alkalis.

The filter that has been frequently used comprises a ceramic porous membrane formed on a porous substrate. Typically, the ceramic porous membrane has a far finer pore size than the porous substrate to improve filtration performance while maintaining a given water permeation rate.

The filter as described above is manufactured by a conventional slurry deposition method, for example a dipping method, wherein a slurry containing ceramic framework particles is deposited on the surface of a porous substrate, and followed by firing the deposition film.

The mean micro-pore size (simply referred to as a micro-pore size hereinafter) of the porous membrane of the filter described above is a crucial factor for determining filtration ability of the filter. The micro-pore size of the porous membrane (or the filtration ability of the filter) has previously been controlled by appropriately selecting the particle size of the framework particles in the slurry. According to the experience of the inventors of the present invention, the micro-pore size is controlled to be ½ to ¼ of the particle size of the framework particles.

However, since the micro-pore size of the porous membrane described above is inevitably determined by the particle size of the framework particles, a problem arises in that the micro-pore size of the porous membrane cannot be precisely controlled when the particle size of the raw framework particles is restricted.

Accordingly, it is an object of the present invention developed in compliance with the technical problems in the conventional art to provide a method for controlling the micro-pore size of the porous membrane, irrespective of the particle size of the framework particles.

SUMMARY OF THE INVENTION

The inventors of the present invention found, through intensive studies of the technical problems in the conventional art, that the micro-pore size of the porous membrane can be controlled by adding a micro-pore size control agent comprising an organic polymer to a film deposition slurry, while appropriately changing the weight ratio between the micro-pore size control agent and the framework particles, thereby completing the present invention.

The present invention provides a method for manufacturing a filter utilizing a ceramic porous membrane as a separation film comprising the step of depositing a film deposition slurry containing ceramic framework particles on the surface of the porous membrane, wherein the slurry contains an organic polymer for expanding gaps among the framework particles, and the micro-pore size of the porous membrane is controlled by adjusting the weight ratio between the framework particles and the organic polymer in the slurry.

DETAILED DESCRIPTION OF THE INVENTION

Figure 1:
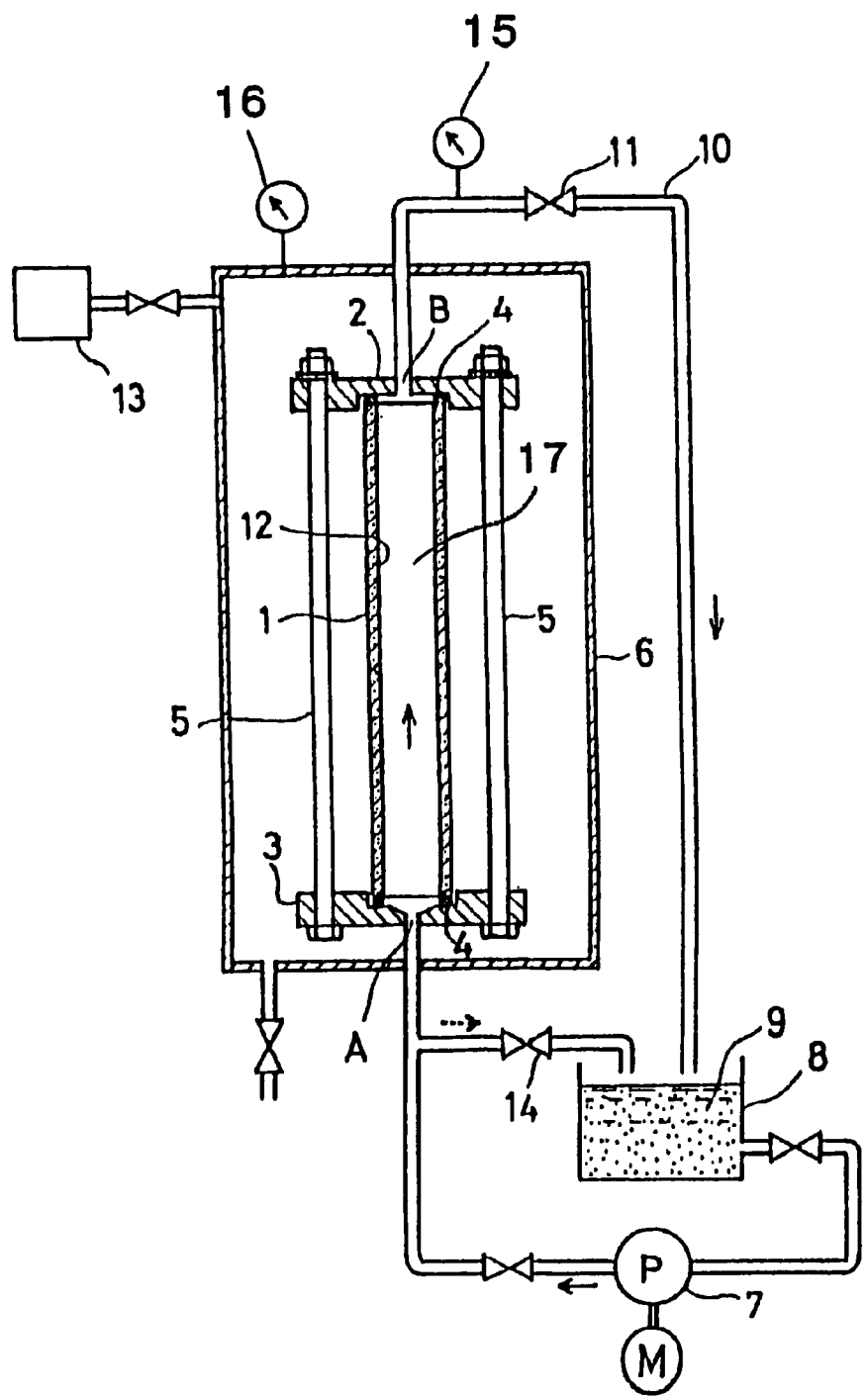
FIG. 1 illustrates an example of the apparatus to be used for the filtration deposition method.

According to the present invention, the film deposition slurry contains an organic polymer for expanding the gaps among the framework particles, and the micro-pore size of the porous membrane is controlled by adjusting the weight ratio between the framework particles and the organic polymer in the slurry. According to the present invention, the micro-pore size of the porous membrane can be controlled irrespective of the size of the framework particles.

The method for manufacturing a filter according to the present invention is described hereinafter in more detail.

The terms "micro-pore size" and "particle size" in the following descriptions refer to "mean micro-pore size" and "mean particle size," respectively.

The porous substrate (referred to as a "substrate" hereinafter) refers to a porous body with many fine pores having a relatively large pore size, such that a porous membrane having much smaller micro-pores may be formed on the surface of the porous body. The shape of the substrate is not particularly restricted, and a substrate plate, a tubular substrate in which a single through-hole is formed along the longitudinal direction of a cylinder, or a revolver magazine type substrate in which a plurality of through-holes are formed along the longitudinal direction of a cylinder may be used.

The material of the substrate is not particularly restricted, so long as the material is porous, and either a ceramic or a metal may be used. However, considering issues of durability, a ceramic material is preferable, and alumina, titania, mullite, zirconia and a mixture thereof may be favorably used.

The term "film deposition slurry" according to the present invention refers to a slurry containing ceramic framework particles for forming a ceramic porous membrane on the surface of the substrate after firing.

The term "framework particles" according to the present invention refers to particles for forming the framework of the porous membrane having a relatively small particle size in a range of about 1 μm to 10 μm.

The composition of the framework particles is not particularly restricted, so long as the particles comprise a ceramic. For example, alumina, titania, mullite, zirconia, silica, spinel or a mixture thereof may be used. However, alumina is preferably used, since alumina is readily available as a starting material, forms a stable slurry, and has a high corrosion resistance.

The concentration of the framework particles in the slurry is preferably adjusted to be within a range of 0.5% to 40% by weight for the film deposition method to be described hereinafter, although it differs depending on the thickness of the deposition film and the deposition method. If the framework particle concentration is less than 0.5% by weight, film deposition takes a long period of time. However, if the framework particle concentration exceeds 40% by weight, the framework particles will readily aggregate, causing film defects on the porous membrane.

A concentration of 30% to 80% by weight is required for the dipping method, otherwise the film cannot be properly deposited.

Additives, such as dispersing agents, and crack prevention agents, which prevent cracks from generating during drying of the deposition film, may also be purposely added.

The foregoing film deposition slurry may be deposited on the surface of the substrate by a conventional film deposition method, for example a dipping method.

However, it is preferable to deposit the film according to the filtration deposition method disclosed by the inventors of the present invention in Japanese Examined Patent Application Publication No. 63-66566. Using this method, film defects such as pin holes can be prevented, a film (i.e., filtration membrane) can be deposited having a uniform thickness, and a porous membrane having a sharp micro-pore size distribution can be obtained.

The filtration deposition method comprises the steps of substituting the air inside the fine pores of the porous substrate with a liquid, isolating the face of the porous substrate to be provided with a filtration membrane to be airtight from the other face of the porous substrate (not provided with the filtration membrane), continuously feeding the film deposition slurry onto the face of the porous substrate to be provided with the filtration membrane, applying a differential filtration pressure between the side of the porous substrate provided with the filtration membrane and the other side of the porous substrate (not provided with the filtration membrane), thus depositing the slurry on the surface of the porous substrate.

A pre-treatment for substituting the air in the fine pores of the porous substrate with a liquid is first applied when using the above filtration deposition method, because the air remaining in the fine pores causes film defects such as pin holes.

After isolating the face of the porous substrate to be provided with a filtration membrane from the other face of the porous substrate, the film deposition slurry is continuously fed onto the face of the pre-treated substrate (to be provided with the filtration membrane) to allow the slurry to contact the face.

Continuously feeding the slurry permits the framework particles in the slurry to form a deposition film having uniform quality and film thickness without heterogeneous precipitation.

The terms "the face to be provided with the filtration membrane" and "the face not provided with the filtration membrane" as used herein refer to the top face and bottom face of a substrate plate, respectively, or the inner wall of the through-holes and the outer circumference face, respectively, of a tubular substrate and a revolver magazine type substrate.

A differential filtration pressure is applied between the face to be provided with the filtration membrane and the face not provided with the filtration membrane, while the slurry is continuously fed on the face to be provided with the filtration membrane.

Actually, air in the pores on the side of the face not provided with the filtration membrane is evacuated, and/or a pressure is applied on the side of the face to be provided with the filtration membrane. Applying a differential filtration pressure permits the liquid substituting the air inside of fine pores of the substrate to be discharged from the side of the face not provided with the filtration membrane, and the slurry deposits on the substrate face to be provided with the filtration membrane.

A substrate having a surface on which a slurry containing framework particles is deposited (referred as a film deposition substrate hereinafter) can be obtained by various film deposition methods as described above.

The film deposition substrate is fired using methods known in the art. For example, a method for firing at a high temperature of about 1400° C. using a tunnel type heating furnace can be used to obtain a filter utilizing the deposited ceramic porous membrane.

However, a porous membrane having a desired micro-pore size could be only obtained by appropriately selecting the particle size of the framework particles for the film deposition method as described above. This is because the gap volume among the framework particles, or the micro-pore size, is inevitably determined by the particle size of the framework particles.

Accordingly, an organic polymer (referred to as a micro-pore size control agent hereinafter) which permeates and expands the gaps among the framework particles was added to the film deposition slurry according to the manufacturing method of the present invention. Consequently, it is possible to obtain a larger micro-pore size without changing the particle size of the framework particles used.

The micro-pore size control agent should be able to isolate the framework particles from one another by invading gaps among the framework particles. Additionally, the agent should be a material that does not plug the micro-pores of the porous membrane and the fine pore of the porous substrate after forming a porous membrane by firing. Long-chain molecules like organic polymers are preferable in that they stay within the substrate and the deposition film layer to further expand the gap volume among the framework particles.

While an acrylic resin may be used as the micro-pore size control agent, polysaccharides, particularly welan gum, agar and a mixture thereof are preferably used. Polysaccharides, such as welan gum and agar, can greatly expand the gap volume even when added in a minute amount, because they act as larger molecules by forming molecular networks.

Welan gum is a kind of polysaccharide having repeating units comprising either (1) two molecules of glucose, two molecules of rhamnose and one molecule of glucuronic acid, or (2) two molecules of glucose, one molecule of rhamnose, one molecule of mannose and one molecule of glucuronic acid.

The term "mixture" as used in the present invention refers to a mixture containing 1% by weight or more of welan gum or agar.

While the substance to be mixed with welan gum or agar is not particularly restricted, saccharides such as a monosaccharide (for example glucose) as well as polyvinyl alcohol, acrylic resin and polyethylene glycol may be used.

According to the present invention, the micro-pore size of the porous membrane can be controlled by adjusting the weight ratio between the framework particles and the micro-pore size control agent. In other words, a larger weight ratio of the micro-pore size control agent makes the micro-pore size larger, even without adjusting the particle size of the framework particles. Consequently, a filter comprising a porous membrane having the desired micro-pore size may be manufactured, irrespective of the particle size of the framework particles.

A porous membrane having a larger micro-pore size may also be formed using framework particles having a smaller particles size in the manufacturing method according to the present invention. Such porous membranes comprise a larger proportion of air voids, even when the membrane has the same micro-pore size as the porous membrane formed without adding a micro-pore size control agent and using framework particles having a large particle size. This is because a porous membrane formed from framework particles having a smaller particle size has greater number of the micro-pores per unit area.

The manufacturing method according to the present invention is quite advantageous in that a filter having a higher water permeation rate (a high treatment ability) can be manufactured, even when micro-pore size that determines filtration ability is identical.

While the manufacturing method according to the present invention is described hereinafter with reference to the examples, the present invention is by no mean restricted to the examples as set forth herein.

The porous substrate, film deposition slurry, the film deposition method and the firing method will be described below.

(1) Porous Substrate

The substrate B and the substrate C were used in Example 1 and Example 2, respectively, as the porous substrates (referred to as "substrate" hereinafter). The substrates were subjected to a pre-treatment by which the air in the fine-pores of the substrate was substituted with water by immersion for more than three hours under a reduced pressure of 0.1 atm or below, then the film is deposited by the filtration deposition method.

1. Substrate A: alumina with a tubular and cylindrical shape (outer diameter, 10 mm; inner diameter, 7 mm; length, 1000 mm), mean fine pore diameter: 10 $\mu$m (measured by a pressurized injection method of mercury)

2. Substrate B: prepared by depositing an alumina porous membrane on the inner wall face of the through-hole; thickness of the porous membrane: 150 $\mu$m; mean micro-pore size of the porous membrane: 0.8 $\mu$m (measured by an air-flow method)

3. Substrate C: prepared by depositing an alumina porous membrane on the inner wall face of the through-hole of the cylindrical revolver magazine type substrate; substrate material: alumina; shape of the substrate: cylindrical revolver magazine type (inner diameter, 30 mm; length, 1100 mm; 61 through-holes with a diameter of 2.5 mm), mean fine-pore size of the substrate: 10 $\mu$m (measured by a pressurized injection method of mercury), mean micro-pore size of the porous membrane: 0.5 $\mu$m (measured by a pressurized injection method of mercury)

(2) Film Deposition Slurry

The film deposition slurry (referred as a slurry hereinafter) was deposited on the substrate after a vacuum degassing treatment for removing air bubbles in the slurry.

(3) Film Deposition Method

The dipping method or the filtration deposition method was used to deposit the film.

For the film deposition body prepared using the dipping method, a dip film was formed by pulling up the substrate after immersing it in the film deposition slurry, followed by drying in an atmosphere at 110° C.

In the filtration deposition method, an apparatus as shown in FIG. 1 comprising a vacuum chamber 6, a reservoir 8, a slurry pump 7, flanges 2 and 3, and a tubing 10 was used.

After securing both opening terminals of the through-hole 17 of the substrate 1 with O-rings 4, the flanges 2 and 3, and bolts 5, so that the outer circumference side of the substrate 1 is isolated to be airtight from the inside of the through-hole 17, the slurry 9 in the reservoir 8 was continuously fed into the through-hole 17 with a slurry pump 7 at a feed pressure of 2 kg/cm$^2$ for 30 seconds.

The slurry 9 not deposited on the substrate 1 passes through the through-hole 17 and is recycled to the reservoir 8 through the tubing 10.

The inside of the vacuum chamber 6 is evacuated thereafter to a reduced pressure of 0.1 atm or below while continuously feeding the slurry 9. The slurry in the through-hole 17 was deposited by sucking in vacuum from the outer circumference side of the substrate 1 by applying a differential filtration pressure of 1 kgf/cm2 between the outer circumference side of the substrate 1 and inside of the through-hole 17. The differential filtration pressure in this case corresponds to a differential pressure between the pressure of the slurry 9 in the through-hole 17 indicated by a pressure gauge 15, and the atmospheric pressure in the vacuum chamber 6 indicated by a pressure gauge 16.

After completing film deposition, the excess slurry in the through-hole 17 is discharged, and moisture contained within the deposition film layer and fine-pores of the substrate was vacuum dehydrated by continuously evacuating at a reduced pressure of 0.1 atm or below. A film deposition body was obtained by drying the substrate at 110° C.

(4) Firing Method

An electric furnace for use in the air was used for firing.

The term "agar preparation" as used in the table refers to a mixture comprising 60% by weight of agar and a balance of glucose, and Aron AS-7503 (trade name) made by Toa Synthetic Chemicals, Co. was used as the acrylic resin.

Aron AS-7503 (trade name) is a aqua-sol type acrylic resin, and is formulated as a W/W type emulsion prepared by graft-polymerization of a water soluble acrylic acid based monomer.

EXAMPLE 1

The effect of controlling the micro-pore size of the porous membrane by the weight ratio between the framework particles and the micro-pore size control agent was investigated in Example 1.

The film deposition slurries listed in TABLE 1 were prepared by adding the framework particles into an aqueous solution of the micro-pore size control agent with mixing. An alumina powder was used as the framework particles. The concentration of the framework particles in the slurry was 40% by weight and 3% by weight in the dipping method and filtration deposition method, respectively. The firing condition was 1350° C. for 1 hour.

Figure 2:
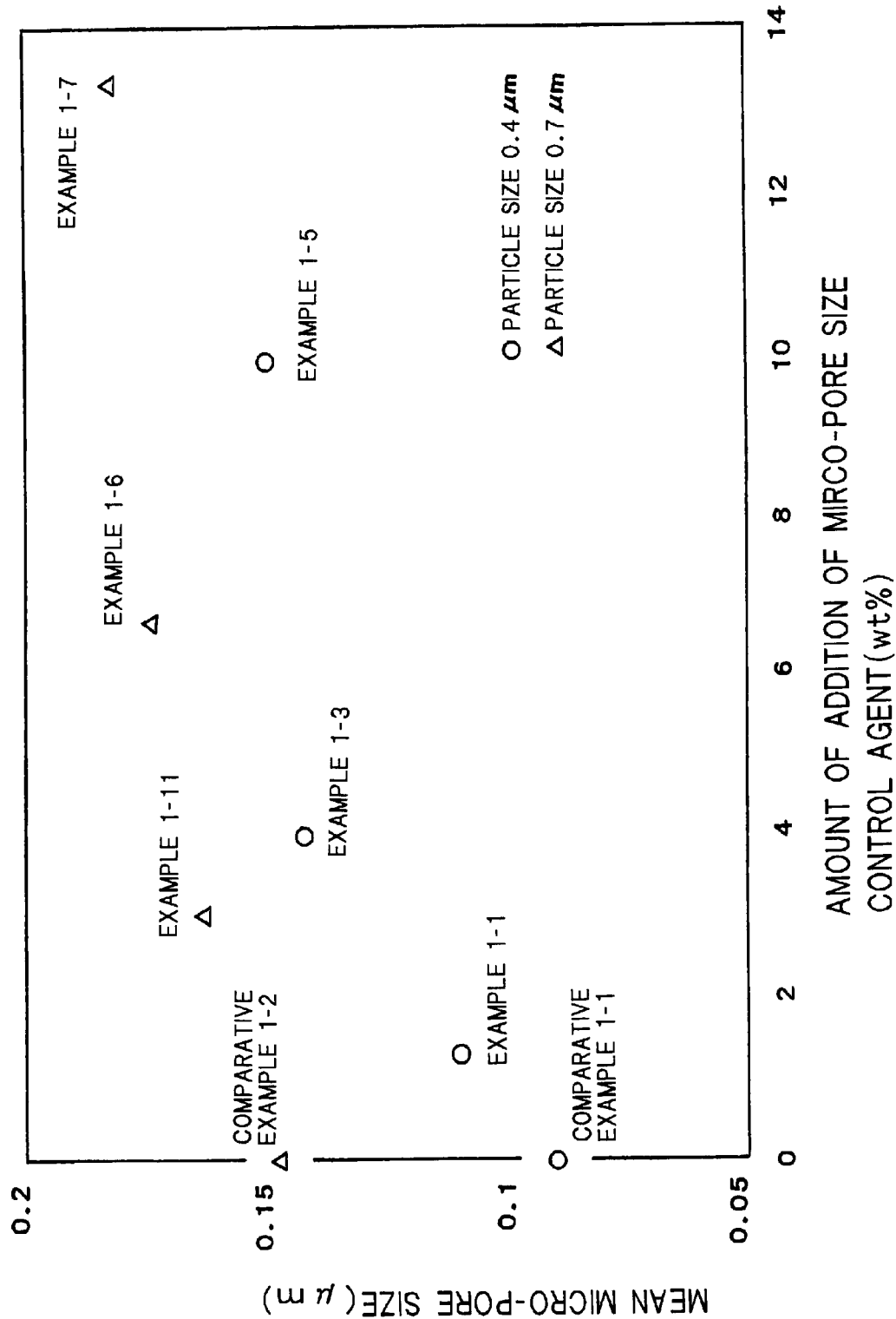
FIG. 2 is a graph showing the relation between the amount of addition of the micro-pore size control agent and the mean micro-pore size of the porous membrane.

The micro-pore size of the deposited porous membrane was measured following the air-flow method described in ASTM F306. Water permeation rate of the filter was assessed by the volume of water permeated per unit filtration area and unit time under a differential pressure of 1 kgf/cm$^2$ at a water temperature of 25° C. The results are shown in Table 1 and FIGS. 2 and 3.

TABLE 1

| | COMPOSITION OF FILM DEPOSITION SLURRY | | | | EVALUATION OF FILTER CHARACTERISTICS | | |
| --- | --- | --- | --- | --- | --- | --- | --- |
| | FRAMEWORK | | CONTROL AGENT/ | | POROUS MEMBRANE | | WATER PERMEATION |
| UNIT | PARTICLE SIZE μM | CONTROL AGENT | FRAMEWORK/ RATIO WT %/WT % | FILM DEPOSITION METHOD | MEAN PORE SIZE μM | MAX. PORE SIZE μM | RATE OF FILTER M³/M²/DAY |
| COMPARATIVE EXAMPLE 1-1 | 0.4 | — | — | FILTRATION | 0.090 | 1.5 | 13 |
| EXAMPLE 1-1 | 0.4 | AGAR PREPARATION | 1.3 | FILTRATION | 0.110 | 1.0 | 17 |
| EXAMPLE 1-3 | 0.4 | AGAR PREPARATION | 4.0 | FILTRATION | 0.142 | 1.0 | 20 |
| EXAMPLE 1-5 | 0.4 | AGAR PREPARATION | 10.0 | FILTRATION | 0.150 | 1.1 | 22 |
| EXAMPLE 1-2 | 0.4 | AGAR PREPARATION | 1.3 | DIPPING | 0.111 | 1.5 | 18 |
| EXAMPLE 1-4 | 0.4 | AGAR PREPARATION | 4.0 | DIPPING | 0.143 | 1.7 | 21 |
| COMPARATIVE EXAMPLE 1-2 | 0.7 | — | — | FILTRATION | 0.148 | 1.8 | 16 |
| EXAMPLE 1-11 | 0.7 | AGAR PREPARATION | 3.0 | FILTRATION | 0.174 | 1.1 | 18 |
| EXAMPLE 1-6 | 0.7 | AGAR PREPARATION | 6.7 | FILTRATION | 0.174 | 1.1 | 21 |
| EXAMPLE 1-7 | 0.7 | AGAR PREPARATION | 13.3 | FILTRATION | 0.182 | 1.0 | 22 |
| EXAMPLE 1-8 | 0.7 | ACRYLIC RESIN | 40.0 | FILTRATION | 0.200 | 1.1 | 23 |
| EXAMPLE 1-9 | 0.4 | WELAN GUM | 5.0 | FILTRATION | 0.131 | 1.0 | 20 |
| EXAMPLE 1-10 | 0.5 | WELAN GUM | 4.0 | FILTRATION | 0.131 | 1.0 | 18 |
| COMPARATIVE EXAMPLE 1-3 | 0.5 | — | — | FILTRATION | 0.110 | 1.6 | 16 |

Results

As shown in FIG. 1, a porous membrane with a micro-pore size of 0.090 μm is formed when framework particles with a particle size of 0.4 μm is used and the porous membrane is deposited from a slurry not supplemented with the micro-pore size control agent (Comparative Example 1-1).

However, when the micro-pore size control agent is added, the micro-pore size could be expanded, and could be controlled by the weight ratio between the framework particles and the micro-pore size control agent (Examples 1-1, 1-3 and 1-5). Expanding the micro-pore size of the porous membrane permits the water permeation rate of the filter to be increased.

The micro-pore size of the porous membrane could be controlled by the weight ratio between the framework particles and the micro-pore size control agent in the dipping method as in the filtration deposition method, allowing the water permeation ratio of the filter to increase as the micro-pore size increases (Examples 1-2 and 1-4).

However, the maximum micro-pore size of the porous membrane obtained by the filtration deposition method is smaller than that obtained by the dipping method, although the mean micro-pore size is identical, showing that the filtration deposition method could afford a sharp micro-pore size distribution as compared with the dipping method.

When the framework particle size is 0.7 μm, the micro-pore size of the porous membrane could be controlled by the weight ratio between the framework particles and the micro-pore size control agent as in the case when framework particles having a micro-pore size of 0.4 μm were used, also allowing the water permeation rate of the filter to be increased (Examples 1-6 to 1-8).

Figure 3:
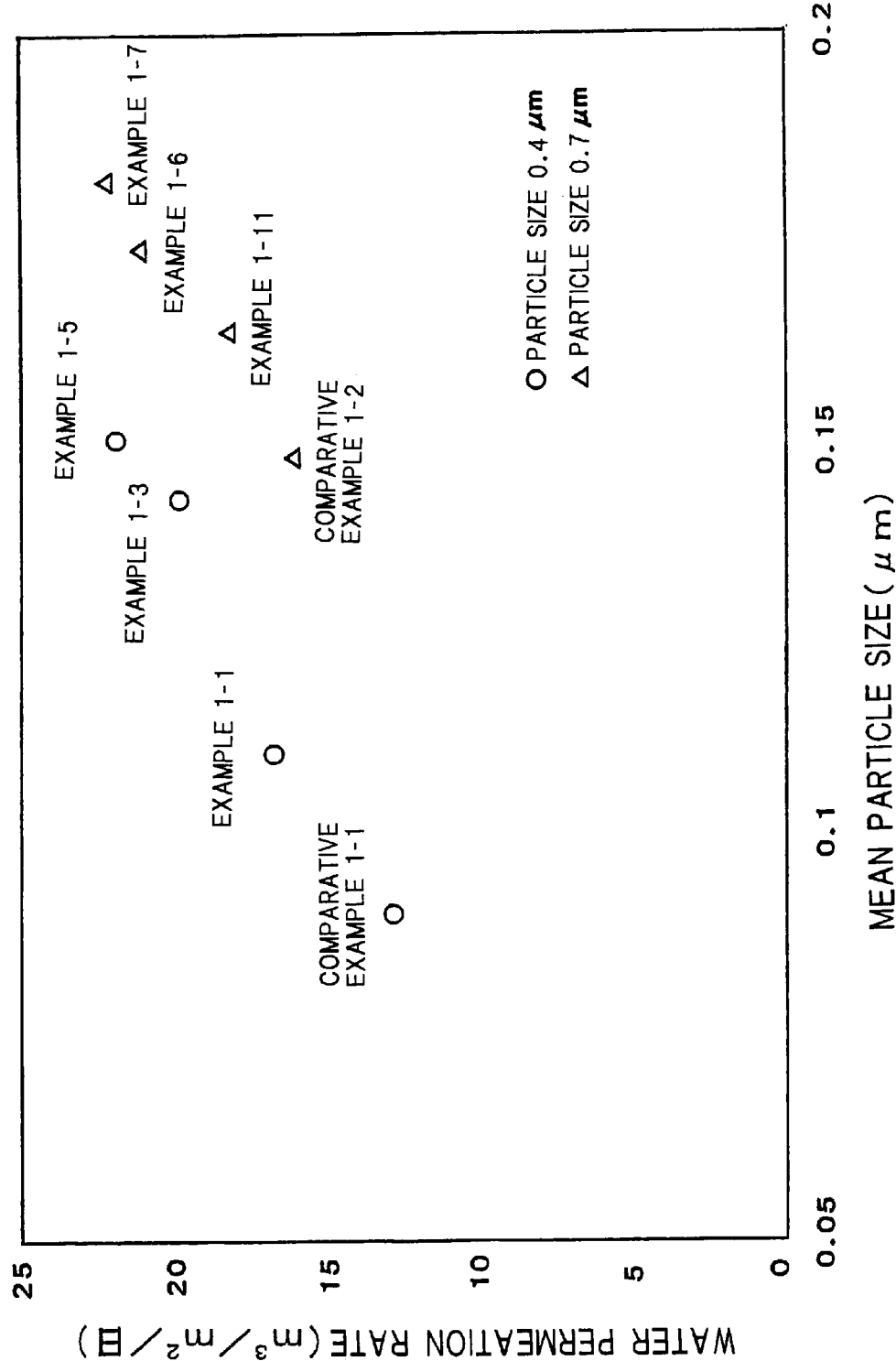
FIG. 3 is a graph showing the relation between the mean micro-pore size of the porous membrane and the water permeation rate of the filter.

In other words, a given correlation was observed between the weight ratio of the framework particles to the micro-pore size control agent and the mean micro-pore size of the porous membrane (the graph in FIG. 2), or between the mean micro-pore size and the water permeation rate of the filter (the graph in FIG. 3).

Other than the agar preparation (Examples 1-1- to 1-5), the same results as described above could be obtained when the acrylic resin (Example 1-8) and welan gum (Examples 1-9 and 1-10) were used as the micro-pore size control agent. However, the same effects obtained using the agar preparation could not be obtained using the acrylic resin, unless the weight ratio between the framework particles and the micro-pore size control agent is increased. This means that welan gum and agar preparation is excellent in that good results could be obtained by adding a smaller amount of the micro-pore size control agent.

The micro-pore size was controlled to be equal by changing the weight ratio between the framework particles and the micro-pore size control agent in Examples 1-9 and 1-10 even when the particle size of the framework particles is different. However, the water permeation rate was higher in Example 1-9 with a smaller particle size of framework particles. This is conjectured because the air void ratio is larger despite the same micro-pore size.

EXAMPLE 2

The manufacturing method according to the present invention can be also applied for the low temperature firing method in Japanese Unexamined Patent Application Publication No. 10-236887 disclosed by the inventors of the present invention. In the above low temperature firing method, a binder, such as a fine power ceramic or ceramic sol particles comprising titania and zirconia, or a compound such as zirconium oxychloride and titanium tetrachloride that is converted into a ceramic by heat treatment is added into the film deposition slurry, and the mixture is fired at a low temperature of 300 to 700° C. where no neck is formed among the framework particles.

The effects of controlling the micro-pore size by the concentration of the micro-pore size controlling agent in the low temperature firing slurry were examined in Example 2.

Alumina powder having a particle size of 0.3 μm was used as the framework particles, and Aron AS-7503 (trade name) was used as the acrylic resin for the micro-pore size control agent.

Titania sol particles with a particle size of 30 nm were used as the binder. Titanium isopropozide was hydrolyzed to prepare an aqueous titania sol solution with titania concentration of 15% by weight and a pH value of about unity.

The particle size of the sol particles was measured with a transmission type electron microscope. The mean value of the maximum diameter and the minimum diameter of the sol particles, or the mean value among 100 sol particles was defined to be the particle size of the sol.

A slurry was prepared as follows. A mixed solution was prepared by dropwise adding 0.1% to 1% by weight of an aqueous solution of an acrylic resin to 15% by weight of an aqueous solution of titania sol, and an alumina slurry was independently prepared by suspending an alumina powder with a solid fraction concentration of 50% by weight in water and adjusted to pH 2 with 60% by weight of nitric acid.

The alumina slurry was then added to the mixed solution above dropwise, and the film deposition slurries listed in Table 2 were prepared by mixing for 1 hour with a stirrer. The concentration of framework particles was 3% by weight in all the slurries.

The slurry prepared as described above was deposited on the substrate C by the filtration deposition method, and a filter was obtained by firing at 600° C. for 4 hours. Photographs of the cross section of the porous membrane were taken using a scanning electron microscope so that the membrane length corresponding to 50 μm falls within one field of view, and the film thickness of the porous membrane was determined to be a mean value of the film thickness measured with respect to 100 fields of view.

The micro-pore size distribution was measured by the air-flow method described in ASTM F306, and the water permeation rate was assessed by the water permeation volume per unit filtration area per unit time with an interlayer differential pressure of 1 kg/cm$^2$ at a temperature of 25° C. The results are shown in Table 2.

TABLE 2

| | COMPOSITION OF FILM DEPOSITION SLURRY | | | | EVALUATION OF FILTER CHARACTERISTICS | | |
|---|---|---|---|---|---|---|---|
| | FRAMEWORK PARTICLES | | BINDER | CONTROL AGENT/ | POROUS MEMBRANE | | WATER |
| UNIT | PARTICLE SIZE μM | CONCEN-TRATION WT % | CONCEN-TRATION WT % | FRAMEWORK PARTICLE RATIO WT/WT % | FILM THICKNESS μM | MEAN MICRO-PORE SIZE μM | PERMEATION RATE OF FILTER M$^3$/M$^2$/DAY |
| EXAMPLE 2-1 | 0.3 | 3 | 0.6 | 0.3 | 15 | 0.11 | 11 |
| EXAMPLE 2-2 | 0.3 | 3 | 0.6 | 1.3 | 15 | 0.11 | 14 |
| EXAMPLE 2-3 | 0.3 | 3 | 0.6 | 4.0 | 15 | 0.14 | 20 |
| EXAMPLE 2-4 | 0.3 | 3 | 0.6 | 33.3 | 15 | 0.16 | 21 |

Results

As shown in Table 2, the mean micro-pore size of the porous membrane could be expanded by increasing the weight ratio between the framework particles and the pore-size control agent in the low temperature firing method, thereby permitting the air void ratio and the water permeation rate of the filter to be increased.

Industrial Applicability

As described herein, it is possible to form a porous membrane having a desired micro-pore diameter, according to the present invention.

The manufacturing method according to the present invention is quite useful in that a filter with a larger water permeation rate (or a higher treatment ability) can be manufactured even when the framework particle size that once determined the filtration ability is not changed.

What is claimed is:

1. A method of manufacturing a filter comprising a porous substrate having a porous ceramic separation membrane formed on a surface thereof, comprising the steps of:
    preparing a slurry comprising a plurality of ceramic powder framework particles and a micro-pore size control agent, wherein a predetermined amount by weight of said framework particles is mixed with a predetermined amount by weight of said micro-pore size control agent to control the size of micro-pores in said membrane to be within a predetermined range; and
    depositing said slurry on a surface of said porous substrate,
    wherein said micro-pore size control agent comprises at least one of agar and welan gum.

2. The method of claim 1, wherein a weight percent ratio of said micro-pore size control agent to said framework particles is present in said slurry in a range of 1.3:100 to 10:100.

3. The method of claim 1, further comprising a step of replacing an internal atmosphere of said pores of said porous substrate with a liquid before said depositing step.

4. The method of claim 3, wherein said liquid is water.

5. The method of claim 1, wherein said micro-pore size control agent further comprises at least one of glucose and acrylic resin.

* * * * *